United States Patent [19]

Pettingell

[11] 4,228,076

[45] Oct. 14, 1980

[54] METHOD OF DENSIFYING OPEN-CELLED POLYURETHANE MATERIAL

[75] Inventor: Winslow L. Pettingell, Wooddale, Ill.

[73] Assignee: Foam Cutting Engineers, Inc., Addison, Ill.

[21] Appl. No.: 44,042

[22] Filed: May 31, 1979

Related U.S. Application Data

[63] Continuation-in-part of Ser. No. 876,736, Feb. 10, 1978, abandoned.

[51] Int. Cl.² ............................................. B29D 27/00
[52] U.S. Cl. .................................. 264/321; 264/280; 264/DIG. 66
[58] Field of Search ........ 264/321, 101, 280, DIG. 66

[56] References Cited

U.S. PATENT DOCUMENTS

| | | | |
|---|---|---|---|
| 2,933,767 | 4/1960 | Vieli et al. | 264/321 X |
| 3,050,432 | 8/1962 | Weinbrenner et al. | 264/321 X |
| 3,060,137 | 10/1962 | Gemeinhardt et al. | 264/321 X |
| 3,061,885 | 11/1962 | Rogers et al. | 264/321 X |
| 3,112,524 | 12/1963 | Legler | 264/321 X |
| 3,325,338 | 1/1967 | Geen | 264/321 X |
| 3,400,196 | 9/1968 | Le Roy | 264/321 |
| 3,443,007 | 5/1969 | Hardy | 264/321 |
| 3,475,525 | 10/1969 | Peters | 264/101 |
| 3,506,600 | 4/1970 | Zocco et al. | 264/321 X |
| 3,577,519 | 5/1971 | Gambardella | 264/321 X |
| 4,073,979 | 2/1978 | Pettingell | 427/244 |

Primary Examiner—Philip Anderson
Attorney, Agent, or Firm—Wegner, Stellman, McCord, Wiles & Wood

[57] ABSTRACT

A method of densifying open-celled polyurethane foam is provided in which heated air at a temperature between about 425° F. and 460° F. is circulated through a mass of the foam so as to rapidly and uniformly raise the temperature of the mass to between about 365° F. and 435° F., the mass is then compressed to a desired thickness while its temperature is maintained between 365° F. and 435° F., and the mass is then immediately permitted to cool.

10 Claims, 2 Drawing Figures

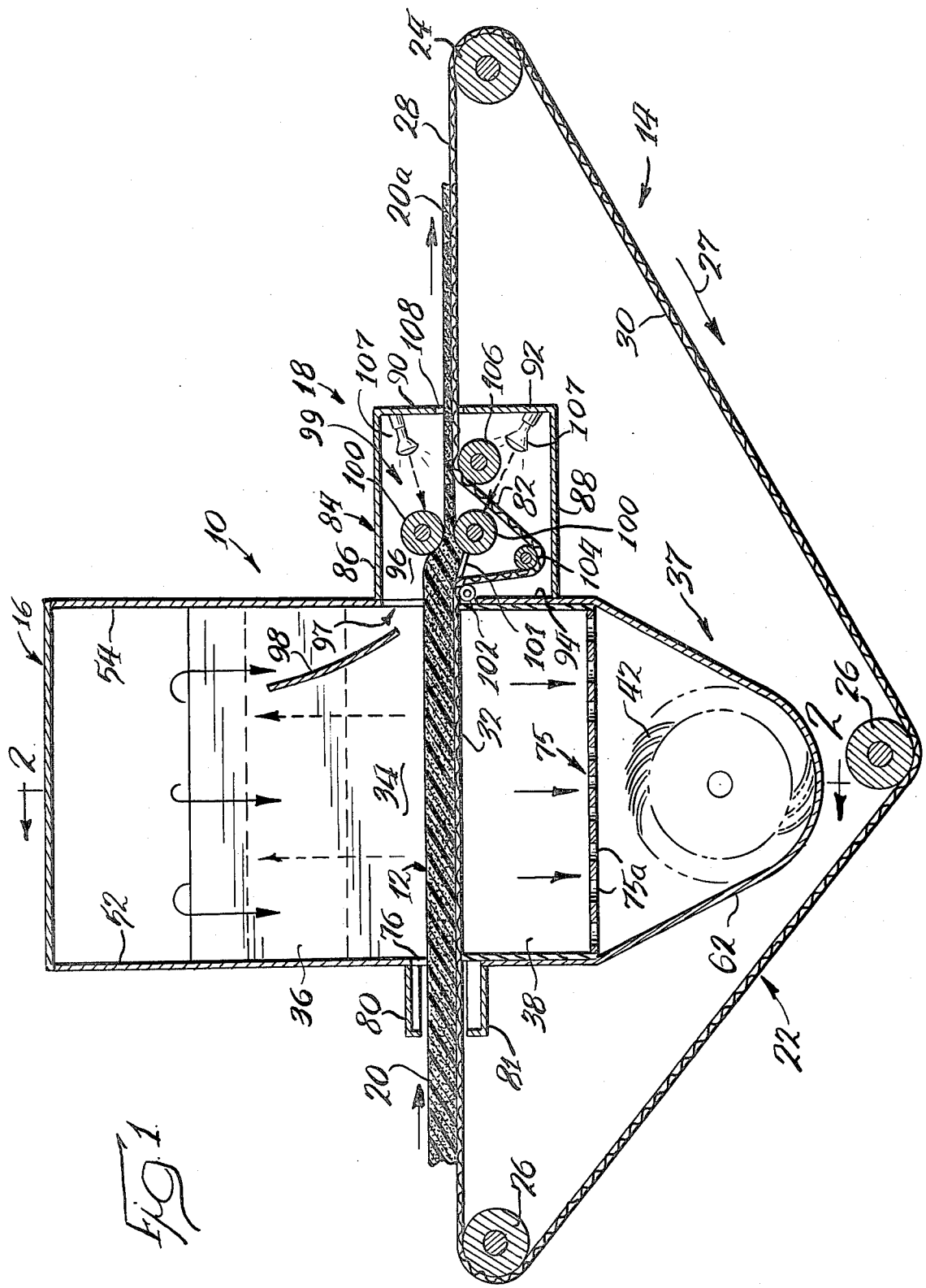

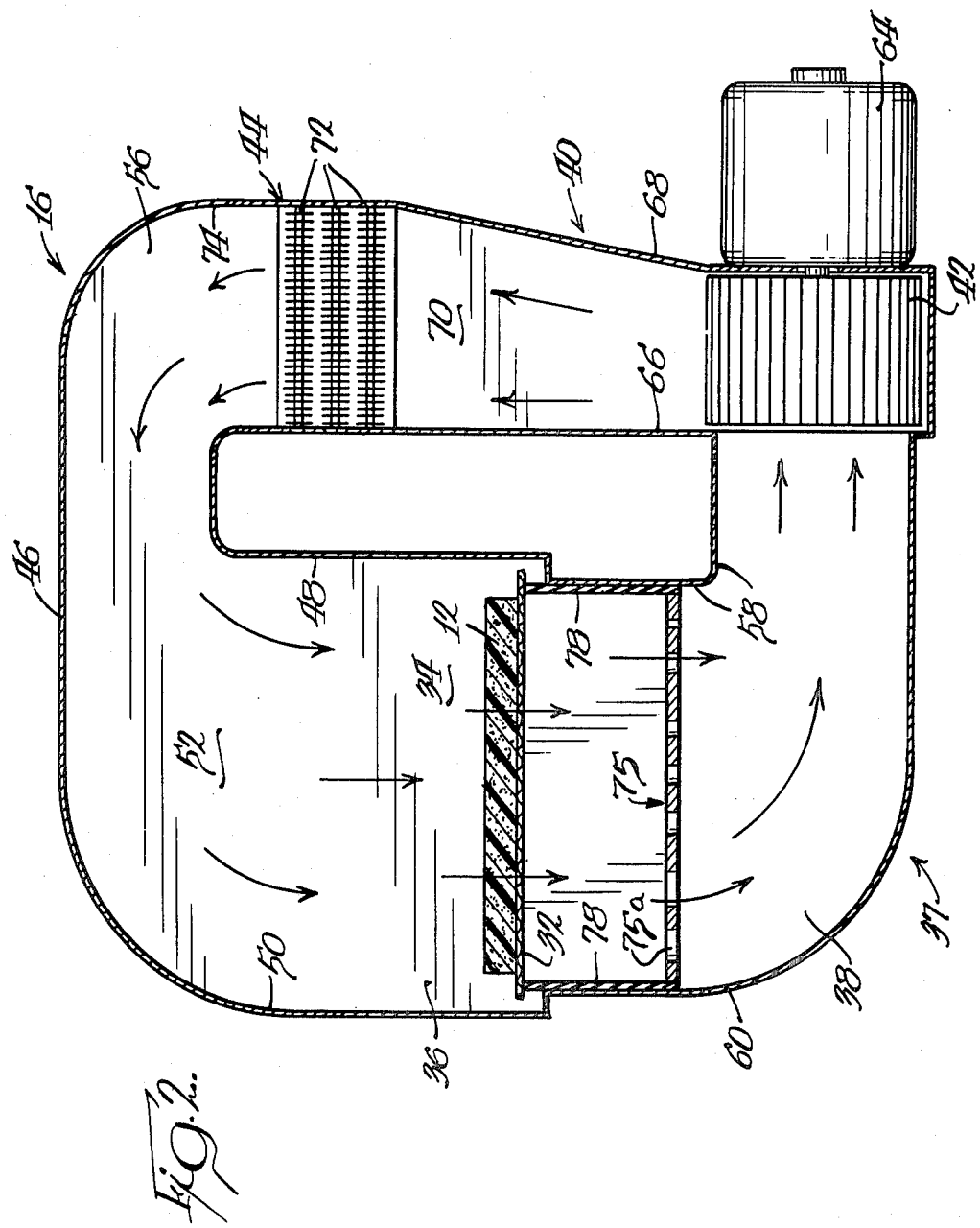

METHOD OF DENSIFYING OPEN-CELLED POLYURETHANE MATERIAL

CROSS-REFERENCE TO RELATED APPLICATION

This application is a continuation-in-part of copending application Ser. No. 876,736 filed Feb. 10, 1978, now abandoned entitled "Method of Densifying Open-Celled Polyurethane Material".

BACKGROUND OF THE INVENTION

1. Field of the Invention

This invention relates to methods of densifying foamed plastic material and, more particularly, to a method of densifying a mass of open-celled polyether or polyester polyurethane foam. While the method is advantageous for material of any thickness, it is especially valuable in treating material which is several inches thick.

2. Description of the Prior Art

Previous methods of densifying open-celled plastic foam articles have relied on the extended application of heat and substantial compressive forces to the surface of the article. This is often carried out by means of large heated metal molds or platens between which the foam is placed. Heat is transmitted to the foam by conduction from the heated platens for a substantial period of time. The low K-factors of air and of polyurethane make such heating processes very time-consuming.

A commercially acceptable polyurethane foam requires a density and other physical characteristics which are quite uniform throughout. This can only be achieved by bringing all parts of a mass of such foam into a predetermined temperature range during processing because the material will return to its pre-treatment state if the treatment temperature is too low, and this necessarily causes a non-uniform product if some parts of the mass are sufficiently hot during treatment and others are not. Prior art processes inherently tend to produce non-uniform material, and are difficult to control because of the very low K-factors previously mentioned.

U.S. Pat. No. 3,577,519 (Gambardella) describes a method of densifying polyurethane foam buns wherein partially cured foam is compressed while still at or near its exothermal reaction temperature. This process may result in non-uniform temperatures and uncontrollable densification, at least in part, due to the relatively rapid cooling of the exterior of the mass and the typically large size of polyurethane reaction buns. This problem is only patially alleviated by the use of heated compression means. Also, the process may not be used to densify fully cured foam.

Further, the heating of a mass of foam by conduction, as in the above-described prior processes, is very inefficient, as great amounts of heat are required to initially heat the compression means, which are often massive, and then to maintain the temperature of the compression means while they are in prolonged contact with the foam.

Another source of inefficiency in previous compression methods is the inability of those methods to adapt to continuous operating conditions. The nature of the prior processes eliminates anything but extremely thin material for densification on a continuous system. Prior processes were generally operated on an intermittent basis which would result in platen marks on continuous strips of foam.

Another disadvantage of prior compression densification methods as applied to cured polyurethane is that very high compressive forces are required until the mass reaches the proper temperature. This requires the use of massive compressive equipment, the cost of which further detracts from the desirability of prior compression methods.

U.S. Pat. No. 3,475,525 (Peters) describes a method of reticulating open-celled polyurethane foam in which a stream of heated gas is passed through the foam in order to heat the foam so as to melt or thermally decompose membranous cell walls without melting the network strands supporting the cell walls. The gas temperature must be above about 480° F. and is generally between about 750° F. and 1470° F., and the thickness of the foam must be less than 0.75 inches to prevent degradation of the network structure. Additionally, the gas velocity through the foam must be in excess of about $3\frac{1}{4}$ ft./sec.

The method of the present invention preserves the cell integrity, since gas temperature and velocity are substantially less than in Peters. Further, the present invention may be effectively applied to foams of thickness much greater than 0.75 inches, the upper limit of the Peters method.

SUMMARY OF THE INVENTION

It is an object of the invention to provide an improved method of densifying open-celled foam and, more specifically, of densifying fully cured open-celled polyurethane foam.

It is a further object of the invention to provide a method of densifying open-celled polyurethane foam which may be carried out so as to provide an end product of uniform density throughout.

Another object of the invention is to provide a method of densifying fully cured open-celled polyurethane foam wherein relatively small compressive forces are required to effect densification.

It is a further object of the invention to provide a method of rapidly densifying open-celled polyurethane foam which may be carried out on continuous strips as well as on separate slabs.

Yet another object of the invention is to provide a method of using circulating hot air to rapidly raise the foam into the proper temperature range while so controlling temperature and air velocity as to avoid breaking down the membranous and skeletal structure of the material.

BRIEF DESCRIPTION OF THE DRAWINGS

FIG. 1 is a longitudinal central sectional view of an apparatus for practicing the method of the invention; and, FIG. 2 is a transverse sectional view taken substantially as indicated along line 2—2 of FIG. 1.

DETAILED DESCRIPTION OF THE INVENTION

FIG. 1 illustrates an apparatus, generally designated 10, to permanently compress and thereby densify a mass 12 of fully cured open-celled polyurethane foam. The apparatus 10 comprises a base (not shown) which includes a planar horizontal support (not shown), an upstanding support means (not shown), an endless conveyor means 14, gas heating and circulating means 16, and compressing means 18 which form an integral part of the heating and circulating means 16.

The purpose of the invention is to densify the mass 12 of chemically stable, open-celled polyurethane foam, which is preferably and illustratively a continuous strip 20, but which may be in the form of separate slabs for batch treatment. The mass 12 is of any thickness, with about ½" to about 7" being typical, and has a density as low as about 0.9 lb/ft³. The density of the mass 12 will generally be between 1.3 lb/ft³ and 2.25 lb/ft³.

The conveyor 14 comprises an endless open mesh belt 22 which travels about a drive drum 24 and a pair of idler drums 26 which carry the belt 22 in the direction of the arrow 27 through a horizontal working run 28 and a return run 30.

One portion 32 of the horizontal working run 28 traverses and is effectively enclosed by a chamber 34 of the gas heating and circulating means 16, said chamber 34 comprising an upper portion 36 and a lower portion 38 disposed above and below the horizontal working run 28, respectively.

Referring to FIG. 2, the gas heating and circulating means 16 comprises an endless conduit system including both portions of said chamber 34 and a housing 40 containing a blower 42 and heating means 44. The upper portion 36 of the chamber 34 is defined by said portion 32 of the horizontal working run 28, part of an upper wall 46, an inner wall 48, an outer wall 50, and parts of a front wall 52 and a rear wall 54, seen in FIG. 1.

The endless conduit system has a hood-like upper member which includes the upper portion 36 of the chamber 34, an upper section 56 of the housing 40, and a trough-like lower member 37 which provides the lower portion 38 of the chamber 34 and constitutes the gas inlet for the blower 42.

The trough-like lower member 37 is defined by said portion 32 of the horizontal run 28, an inner wall 58, an outer wall 60 and an arcuate side and bottom wall 62 (FIG. 1). The lower section of the housing 40 is formed by a section of an inner wall 66, an outer wall 68, a transverse wall 70 extending between the walls 66 and 68, and a transverse wall (not shown) which is parallel to the wall 70.

The blower 42 is a conventional type powered by a motor 64. In operation, the blower 42 circulates gas in the direction of the arrows shown in FIG. 2. The heating means 44 is located above, and thus downstream of, the blower 42 and illustratively comprises a plurality of electric heating elements 72. The upper section 56 of the housing 40 is defined by the upper margin of the heating means 44, the upper part of the inner wall 66, an outer wall 74, part of the upper wall 46, and those parts of the front and rear walls 52 and 54 which extend transversely between the walls 66 and 68.

As noted above, it is necessary to raise the temperature of the mass 12 to a uniformly high level in order to effect uniform densification thereof. Therefore, it is necessary that the gas flow velocity be uniform throughout the chamber 34.

In order to ensure uniform distribution of gas flow across the chamber 34, a perforate baffle plate 75 having a plurality of holes 75a of various sizes is disposed across the chamber 34, substantially perpendicular to the gas flow path, preferably and illustratively in the lower chamber portion 38.

In the absence of a gas distributing means such as the baffle plate 75, gas flow velocities through a given cross-sectional area perpendicular to the gas flow path would tend to be distributed such that gas flowing near the walls 50, 52 and 54, i.e. relatively far from the blower 42, flows at a lower velocity than gas near the wall 48 and centrally between the walls 52 and 54. This effect is especially marked in large ovens. The baffle plate provides variable resistance to gas flow through the chamber 34, with relatively great resistance applied at those points where gas velocity is highest, by means of relatively small holes, with larger holes at points of lower gas velocity. Such baffle plates are well known in the art.

It is to be noted, however, that even the smallest of the holes 75a are large enough to ensure low total resistance at normal flow rates which are less than 1 ft/sec.

Referring to FIG. 1, it is to be noted that the horizontal run 28 of the conveyor 14 and the foam mass 12 carried thereon enters the chamber 34 through an elongate slot 76 and that the bottom of the horizontal run 28 contacts a pair of upstanding sealing walls 78, seen in FIG. 2. The vertical dimension of the opening 76 corresponds closely to the vertical dimension of the combination of the horizontal run 28 and the mass 12, thereby effecting a seal about the mass 12 and the working run 28, and external upper and lower lipped flanges 80 and 81, respectively, aid in reducing the escape of the circulating gas. It is to be understood, however, that the seal is intended only to contain most of the circulating gas and not to provide absolute containment.

The compression means 18 adjoins the gas heating and circulating means 16 at the rear wall 54 thereof, and encloses a section 82 of the working run 28. As seen in FIG. 1, the compression means 18 comprises a housing 84, including a top wall 86, a bottom wall 88, upper and lower rear walls 90 and 92, respectively, a front upstanding wall 94 connected to the wall 88, a side wall 96 extending between the rear walls 90 and 92 and the wall 94, and a second side wall (not shown) disposed opposite the side wall 96. The housing 84 communicates with the chamber 34 through an opening 97 in the wall 54. A deflector plate 98 extends between the walls 48 and 50 of the heating chamber 34 to direct heated gas into the opening 97.

The housing 84 contains compressing means 99, illustratively comprising an opposed pair of driven steel pinch rollers 100. An inclined plate 101 which receives and supports the mass 12 extends between the sidewalls of the chamber 84 and terminates adjacent the surface of the lower roller 100 at a point selected such that the mass 12 is directed substantially centrally between the rollers 100 in order to ensure that equal compressing force is applied to each side of the mass 12, to prevent distortion thereof. It may be understood that other compressing means, such as platens, may be used. Platens are suitable for batchwise compression of foam slabs.

The section 82 of the working run 28 travels over a roller 102 then under a roller 104 disposed below the roller 102, and then over a roller 106 at the downstream end of the housing 84, whereby the working run 28 is separated from the strip 20 of polyurethane foam so as to facilitate the simultaneous application of pressure to both sides of said strip.

If desired, the rollers 100 may be coated with a release agent which facilitates separation of the strip 20 from the rollers 100 after compression of the foam. It has been found, however, that the use of a release agent is generally not necessary in the practice of the invention. The rollers 100 must be maintained at or very near the temperature of the circulating gas and the strip 20 in order to prevent premature cooling of the surface of the strip 20, which would result in non-uniform densification. Deflection of heated gas from the chamber 34 into the housing 84 by the deflection plate 98 and suitable heating means, such as a pair of high-intensity lamps 107 mounted on the walls 90 and 92 and focused on the upper and lower rollers 100, respectively, maintain the temperature of the rollers 100 and the strip 20 at a sufficiently uniform, high level to result in uniform densification.

The strip 20 and the working run 28 exit the housing 84, preferably into a zone at ambient temperature, through a shallow elongate opening 108 between the walls 90 and 92. While the vertical dimension of the opening 108 is not so small as to form an absolute seal about the strip 20 and the working run 28, it is sufficiently small to prevent the loss of any substantial amount of heated gas. The slot 76 and the shallow opening 108 allow moderate escape of heated gas from the system, and the entry of make-up gas.

In operation, the mass 12 is placed on the conveyor 14 and is carried into the chamber 34 where it is contacted by the circulating heated gas. The gas is commonly and illustratively air, but may be another gas or mixture of gases in certain situations. The circulating gas must be chemically inert with respect to the polyurethane, and not otherwise have a tendency to impart undesirable characteristics to the foam.

The circulating air is heated to a temperature between about 425° F. and 460° F. by the heating means 44, and is directed into the chamber 34 where it is drawn downwardly through the mass 12 and the working run 28 by the suction produced by the blower 42, which creates a lower pressure in the lower portion 38 than in the upper portion 36 of the chamber 34.

The open-celled structure of the foam allows the heated air to intimately contact the entire interior cell structure of the foam, thereby rapidly heating the mass 12 to a temperature which is substantially uniform throughout the mass, but which is generally lower than the temperature of the circulating air, e.g. between about 365° F. and 435° F. At gas velocities less than about 1 ft/sec, uniform heating of the mass to the desired temperature level is typically accomplished within 10–15 sec. It is important that the mass 12 does not reach a temperature above approximately 475° F. nor remain at a temperature above about 365° F. for periods longer than about one minute, as undesirable charring of polyurethane may begin under such conditions.

After the temperature of the mass 12 is raised to a temperature between 365° F. and 435° F., the mass 12 exits the chamber 34 and enters the housing 84 via the opening 97, where the mass 12 is maintained at the desired temperature, and is fed between the steel pinch rollers 100 while separated from the working run 28.

The internal resistance of the mass 12 to compressive force is greatly reduced when the temperature of the mass is between about 365° F. and 435° F. In that temperature range, the state of the mass approximates that of its exothermal reaction stage, during which it has low resistance to compressive force and little resilience. As a result, a permanently densified strip 20a may be produced by the application of a relatively small compressive force for a comparatively short time relative to those necessary with previous compression methods. The pressure may be less than 10% of that required by previous methods; and after a brief period of compression, the compressive force may be removed at once without fear of subsequent expansion.

Cooling of the mass to substantially below 365° F. immediately after compression insures permanence of the densification. Cooling occurs very rapidly because of the low specific heat and relatively low density of the mass even after densification. This allows higher production rates than were possible with older methods of densification. Also, the need for heavy molds or platens is obviated, thereby allowing for decreased capital cost. The relative vertical spacing of the rollers 100 is adjustable, thereby allowing for different desired final thicknesses and, therefore, different final densities of the densified strip 20a. The final density of the strip 20a may be up to about 30 lb/ft$^3$.

As an alternative to pinch rollers, two movable platens, or one movable platen and a stationary surface, may be employed as the compressive means 99. If so employed, a first platen is disposed above the mass 12 with its horizontal surface substantially parallel to the upper surface of the mass, and a second platen (or stationary surface) is disposed below the mass 12, with its surface substantially parallel to the surface of the first platen. The upper platen, or both platens, are moved vertically toward one another so as to apply compressive forces to the upper and lower surfaces of the mass.

It may be noted that certain aspects of the operation are different if platens are used as the compressing means, rather than pinch rollers. Operations with platens are necessarily performed in a discontinuous manner, as it is necessary to stop the movement of the conveyor when the platens are in their closed position around the mass 12. The use of platens is especially suitable for use with individual slabs of foam as opposed to continuous strips, although platens may be used to successively densify portions of a strip, thereby effecting densification of the entire strip.

The surfaces of the compressing means 99 may be smooth or embossed, depending on the desired surface appearance of the finished product.

After compression, the densified strip 20a and the working run 28 exit the housing 84 through the opening 108; and after the strip 20a has cooled, it may be further cut, shaped, etc.

It may be noted that due to the extremely rapid nature of the cooling process, further operations may be undertaken almost immediately after the strip 20 exits the housing 84.

The following specific examples will serve to more fully illustrate the practice of the present invention.

A series of foam densification tests were conducted on an apparatus such as shown in FIGS. 1 and 2. The rollers 100 were of steel and were each 8" in diameter, with spacings of 0.14" and 0.125" in successive series of tests. The rollers were heated by two 400 watt quartz infra-red lamps focused on the roller surfaces, as shown in FIG. 1.

The belt 22 was 93% open steel mesh and was chain driven by a ¼ Hp. capacity D.C. gear head motor. The rollers 100 were driven by the same motor, and were interconnected with the belt 93 through a gear arrangement allowing independent variation of the speeds of the rollers 100 and the belt 93, with a maximum belt speed greater than 125"/min.

Air temperature was controlled by control of voltage to the finned strip heaters 72 by a Variac.

The blower 42 had a capacity of 160 ft$^3$/min. The cross-sectional area of the chamber 34 was about 2 ft$^2$ giving a maximum air flow velocity of about 1.3 ft/sec. The length of the heating chamber 34 between the front and rear walls 52 and 54 was about 20". Actual air velocity was believed to be about 0.5–0.7 ft/sec., due to resistance from the foam mass 12.

It was found that the conveyor and roller system was easily stalled by feeding a 14" wide, ¾" thick strip of unheated polyurethane foam having a nominal density of 2 lb/ft³ and an ILD (indentation load deflection) characteristic of 36 to the rollers at about 96"/minute. However, there was negligible resistance when an identical strip was heated to temperatures between about 365° F. and 435° F.

The results of the tests are summarized in Table I:

TABLE I

| Test No. | Material Designation | Entering Thickness | Conveyor Speed (in/min) | Entering Air Temp. (°F.)(3) | Mass Temp. (°F.)(4) | Roller Temp. (°F.) | % Stretch | Post Compression Thickness | Product Quality |
|---|---|---|---|---|---|---|---|---|---|
| 1 | 4530(1) | 1" | 96 | 455 | 380 | 420 | 7% | .135" | Good |
| 2 | 4530 | 1" | 96 | 450 | 395 | 420 | 8% | .135" | Fair |
| 3 | 4530 | 1" | 100 | 455 | 365 | 415 | 7% | .135" | Fair |
| 4 | 4530 | 1" | 125 | 425 | 375 | 405(5) | — | — | Poor |
| 5 | 4530 | 1" | 112 | 460 | 405 | 430(5) | 5% | .135" | Good |
| 6 | Ester(2) | ½" | 100 | 450 | 430 | 410 | 4% | .135" | Good |
| 7 | 4530 | 1" | 84 | 430 | 400 | 440 | 4.5% | .13" | Excellent |
| 8 | 2555(1) | 1⅛" | 84 | 450 | 375 | 400 | — | — | Poor |
| 9 | 2555 | 1⅛" | 96 | 460 | 435 | 460 | — | .125" | Excellent |
| 10 | 4536(1) | 1⅛" | 96 | 460 | 400 | 460 | — | .125" | Excellent |

(1)Flexible Foam 4530 2 lb/ft³ 30 ILD Ether
(Chattanooga, 4536 2 lb/ft³ 36 ILD Ether
Tennessee) 2555 2 lb/ft³ 55 ILD Ether
(2)Crest Foam (Moonachie, New Jersey) 2 lb/ft³ Charcoal Ester
(3)Measured immediately above mass in chamber 36.
(4)Measured as air temperature immediately below conveyor belt at chamber exit 97.
(5)Roller heat lamps not used.

All foam density values are nominal and, where a stretch or thickness value is not given, no measurement was made.

The time required to bring the temperature of the circulating air and the rollers to a desired level was about thirty minutes, as opposed to the required start-up time of four hours or more experienced with prior platen compression systems.

It was noted that when the roller temperature was reduced, the surface of the product foam was fuzzy and not fully densified, thus showing that, if desired, foam of nonuniform density may be produced.

Exposure time of the foam to heated air varied between about 10 seconds at a conveyor speed of 125 in/min to about 15 seconds at a conveyor speed of 84 in/min. It is not believed that exposure times longer than 15 seconds give improved results, except when the initial foam thickness is greater than about 7 in.

Of course, it will be apparent that required foam/gas contact time is a function of foam thickness and gas temperature, with longer contact times being required for very thick (i.e. greater than 7 in.) foams and in cases where the gas is heated only to relatively low temperatures. However, it is believed that contact times substantially greater than 15 seconds will rarely, if ever, be required at adequate heat.

The ¼ Hp. motor was more than sufficient to power the system when the foam was heated before and during feeding to the rollers, thus indicating that required pressure is negligible compared to prior systems. It is believed that the required horsepower increases with increased roller size, which in turn increases with the initial thickness of the mass 12. It is also believed that horsepower requirements increase with the desired degree of densification of a given thickness of foam.

It is to be noted that the foam may be elongated if desired by increasing the speed of the rollers relative to that of the conveyor belt.

It is to be understood that the use of the subject invention is limited to those foams which have an open-celled structure which allows penetration of the foam by the flow of heated gaseous material. It should also be noted that either open-celled polyester or polyether urethane may be employed with equally good results. It is believed that the process of the invention may be advantageously applied to foams of synthetic resins other than polyurethane.

It will be readily apparent from the foregoing detailed description and test results that the present invention provides a foam densification process whereby capital and operating expenditures are significantly decreased due to the absence of the requirement of massive pressure and heat application equipment.

It is believed that the time required to effect foam densification according to the present invention is only about 10% of that required by prior methods, thus allowing significantly increased production rates. The relatively short required start-up and turn-around periods also contribute significantly to increased production rates.

The foregoing detailed description is given for clearness of understanding only, and no unnecessary limitations should be understood therefrom as modifications will be obvious to those skilled in the art.

I claim:

1. A method of densifying a mass of fully cured open-celled polyurethane foam, said method comprising the consecutive steps of:

passing heated gaseous material entirely through the mass, the temperature of said gaseous material being in the range of about 425° F. to 460° F. and the velocity of said gaseous material being insufficient to destroy the integrity of the cell walls of the mass, said gaseous material being inert with respect to the polyurethane, and the period of exposure of the mass to the gaseous material being insufficient to allow charring of the mass, yet sufficient to raise the entire mass substantially uniformly to a temperature between about 365° F. and 435° F.;

compressing the mass while its temperature is between about 365° F. and 435° F. to reduce its thickness and thus increase its density to a desired degree; and permitting the mass to cool.

2. The method of claim 1 wherein the gaseous material is air.

3. The method of claim 1 wherein the gaseous material is circulated downwardly through the mass.

4. The method of claim 1 wherein the mass is maintained in the temperature range of 365° F. to 435° F. for a time not exceeding about one minute.

5. The method of claim 1 wherein the mass is moved into a zone at ambient temperature immediately after it is compressed.

6. The method of claim 1 wherein the mass is moved continuously endwise and is compressed between pinch rollers.

7. The method of claim 6 wherein the mass is maintained in the temperature range of 365° F. to 435° F. for a time not exceeding about one minute.

8. The method of claim 7 wherein the mass is permitted to cool by moving it endwise out of the pinch rollers into a zone at ambient temperature.

9. The method of claim 1 wherein the mass is moved in a discontinuous fashion and is compressed between two flat parallel surfaces.

10. The method of claim 9 wherein at least one of said flat parallel surfaces comprises a movable platen.

* * * * *